(12) United States Patent
Diamond et al.

(10) Patent No.: US 11,433,804 B2
(45) Date of Patent: Sep. 6, 2022

(54) METHODS AND APPARATUSES FOR ACCOMMODATING TRAFFIC WHEN USING VEHICLE DOORS

(71) Applicant: FORD GLOBAL TECHNOLOGIES, LLC, Dearborn, MI (US)

(72) Inventors: Brendan F. Diamond, Grosse Pointe, MI (US); Seth Loveall, Dearborn, MI (US); Jonathan Hair, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 17/080,110

(22) Filed: Oct. 26, 2020

(65) Prior Publication Data

US 2022/0126748 A1  Apr. 28, 2022

(51) Int. Cl.
| | |
|---|---|
| *E05B 77/54* | (2014.01) |
| *B60Q 1/32* | (2006.01) |
| *B60Q 9/00* | (2006.01) |
| *B60R 21/015* | (2006.01) |
| *B60R 21/01* | (2006.01) |

(52) U.S. Cl.
CPC ............ *B60Q 1/323* (2013.01); *B60Q 9/002* (2013.01); *B60R 21/01512* (2014.10); *E05B 77/54* (2013.01); *B60R 2021/01252* (2013.01); *E05Y 2900/531* (2013.01)

(58) Field of Classification Search
CPC .. B60Q 1/323; B60Q 9/002; B60R 21/01512; B60R 2021/01252; E05B 77/54; E05Y 2900/531
See application file for complete search history.

(56) References Cited

U.S. PATENT DOCUMENTS

| | | | |
|---|---|---|---|
| 10,026,309 | B1 | 7/2018 | Nepomuceno et al. |
| 10,173,625 | B2 | 1/2019 | Gurghian et al. |
| 10,391,931 | B2 | 8/2019 | Shmueli Friedland et al. |
| 2011/0307146 | A1 | 12/2011 | Yang et al. |
| 2019/0286126 | A1 | 9/2019 | Williams et al. |

FOREIGN PATENT DOCUMENTS

DE         102008012898 A1    9/2009

*Primary Examiner* — Mathew Franklin Gordon
(74) *Attorney, Agent, or Firm* — Michael Spenner; Brooks Kushman P.C.

(57) ABSTRACT

A vehicle computer or vehicle associated computer may determine an upcoming vehicle occupancy change event for an object vehicle. The computer may also determine a suitability-for-use of one or more vehicle doors based on a traffic prediction, responsive to determining the occupancy change event. Further, the computer may alert at least one vehicle occupant as to the suitability-for-use of each door for which the suitability determination was made.

20 Claims, 4 Drawing Sheets

=== PAGE 1 ===
METHODS AND APPARATUSES FOR ACCOMMODATING TRAFFIC WHEN USING VEHICLE DOORS

TECHNICAL FIELD

The illustrative embodiments generally relate to methods and apparatuses for accommodating traffic when using vehicle doors.

BACKGROUND

Many travelers now use ridesharing as a way to reach destinations. While this is little different from a taxi in terms of the care needed by a rider, decreased frequencies in driving to a destination may have a long term impact on the care taken when a rider is exiting a vehicle.

When a driver or main passenger exits a vehicle, those parties have mirrors that can indicate traffic to the sides and rear of a vehicle. Moreover, a driver may consider parking from an exit-advisability standpoint, whereas a ride-share driver may consider parking from an ease-of-resumption standpoint. Even a taxi driver will often obtain the next passenger at a point of drop off, under older models more common before ride-sharing, but ride-sharing drivers almost always have to travel to a hailing location, and so ease-of-resumption may trump advisability-of-exit in parking and drop off selection.

SUMMARY

In a first illustrative embodiment, a system includes a processor configured to determine an upcoming vehicle occupancy change event for an object vehicle. The processor is also configured to determine a suitability-for-use of one or more vehicle doors based on a traffic prediction, responsive to determining the occupancy change event. The processor is further configured to alert at least one vehicle occupant as to the suitability-for-use of each door for which the suitability determination was made.

In a second illustrative embodiment, a system includes a processor configured to determine an upcoming vehicle occupancy change event for an object vehicle based on the object vehicle being parked. The processor is also configured to determine a suitability-for-use of one or more vehicle doors based on a traffic prediction and based on sensed data, responsive to determining the occupancy change event. The traffic prediction is based on at least data wirelessly received from at least one entity remote from the object vehicle and is indicative of projected traffic in a predefined proximity to the one or more vehicle doors. The sensed data includes data about an environment exterior to the object vehicle, sensed by at least one sensor of the object vehicle and is indicative of at least one entity presence predefined as affecting a suitability-for-use determination. The processor is additionally configured to alert at least one vehicle occupant as to the suitability-for-use of each door for which the suitability determination was made.

In a third illustrative embodiment, a system includes a processor configured to determine a plurality of possible parking locations for an occupancy change event planned for an object vehicle at an object vehicle destination. The processor is also configured to determine a suitability-for-use of one or more vehicle doors for each of the plurality of possible parking locations, the suitability determined based on projected traffic patterns for traffic projected to be within a predefined proximity to the one or more vehicle doors, as indicated by data received from at least one entity remote from the object vehicle. Further, the processor is configured to notify a vehicle driver of one or more of the plurality of parking locations for which a suitability-for-use of at least one door is above a predefined suitability threshold.

DETAILED DESCRIPTION

Figure 1:
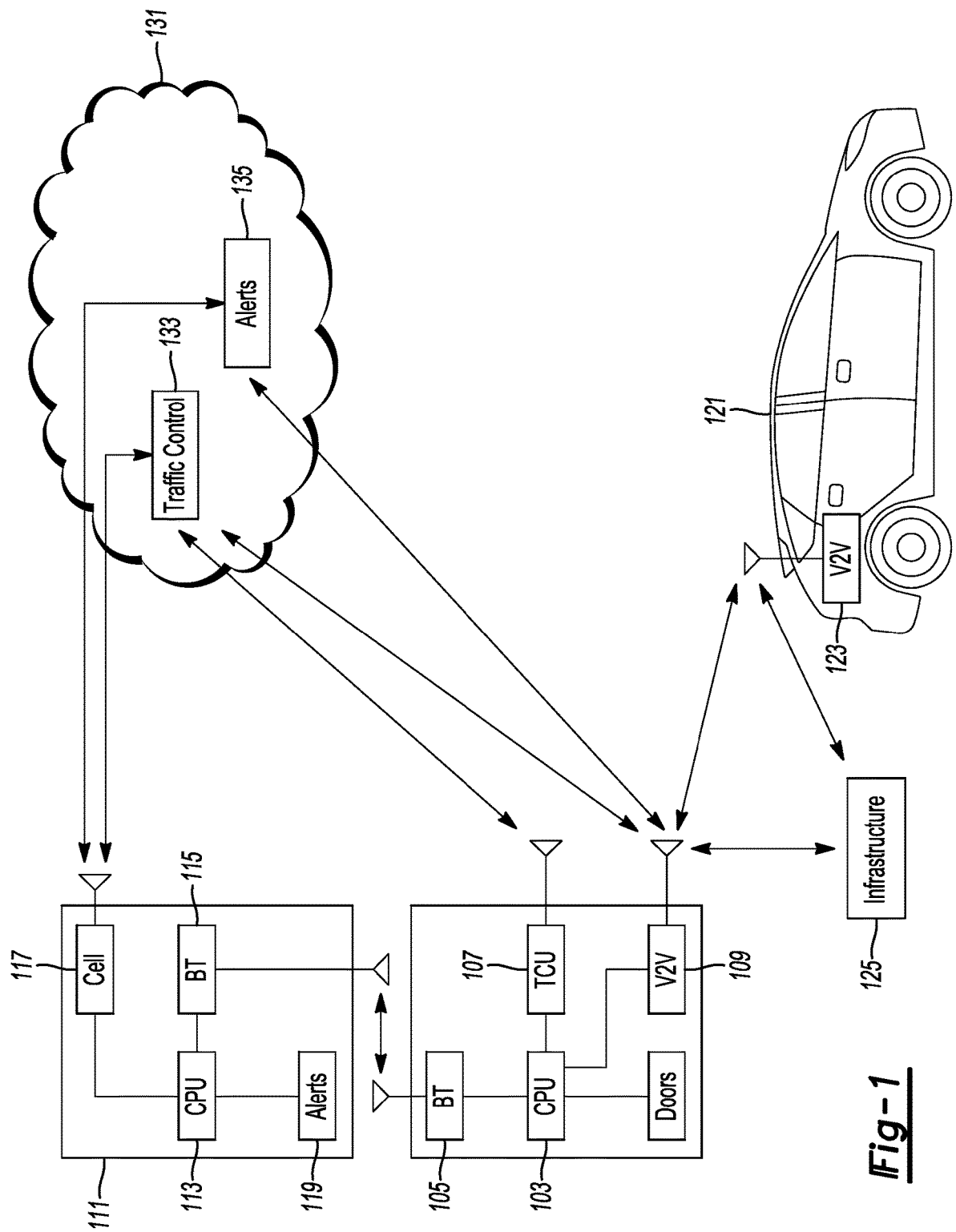
FIG. 1 shows an illustrative example of an occupant notification system and vehicle notification system.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system that includes core computing components such as a microprocessor, memories, wireless and/or wired inputs, etc. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Drivers of their own vehicles will tend to park those vehicles in locations where the driver can easily exit the vehicle, since the driver is contemplating their own exit when parking the vehicle. Taxi drivers often obtain their next ride from a drop-off location, and thus may park in a space where both exit and re-entry (from a curbside door, for example) is possible. Ridesharing is becoming more popular, however, and on-demand drivers may pick up a next passenger from a completely different location than a drop off, making the driver potentially more conscious about how to get back onto the road than where a passenger will be exiting. This can create an issue with the advisability of using a given exit from a vehicle. Potentially compounding this issue is the use of ridesharing by a demographic that may tend to travel in larger groups, which increases the likelihood of using multiple vehicle doors for exit.

The illustrative embodiments present a cross-traffic door advisory system that is capable of, for example, detecting inadvisable exit strategies from a vehicle interior, notifying occupants of an inadvisable exit, notifying other vehicles of an impending exit and, in some instances, simply preventing use of one or more vehicle exits.

FIG. 1 shows an illustrative example of an occupant notification system and vehicle notification system. This system includes, for example, an object vehicle 101 (the vehicle from which people will be departing) that includes a processor 103, a short range communication transceiver 105 (e.g., BLUETOOTH), a long-range communication system 107, such as a cellular modem and telematics control unit (TCU), and a vehicle to vehicle (V2V) communication system 109, which may rely on, for example, Wi-Fi, dedicated short range communication (DSRC) or other suitable mediums.

The vehicle 101 also includes a plurality of doors, and in this example the vehicle 101 includes a door control process 111, which is capable of monitoring advisability status for various doors, providing alerts pertaining to various doors, and even potentially impeding or permitting usage of certain doors. Because there are not typically mirrors provided to rear vehicle exits, it can be difficult for an exiting passenger to gauge approaching traffic, and the process 111, and the like, can assist the passenger in evaluating the advisability of using a particular exit, even, in some instances, going as far as simply preventing usage of the exit based on one or more detected occurrences.

This example system also includes a user device 111, which is a device used to hail a ride in this example, since the example is primarily presented with respect to ridesharing, even though it is applicable to any passenger exiting a vehicle, hailed or otherwise. The user device, such as a smart phone, includes a processor 113, a cellular communication antenna 117, short range communication 115, such as BLUETOOTH, and an alert application 119. The alert application 119 can be a part of or be distinct from a ride-hailing application. The alert application needs to receive alerts from the vehicle 101 in this example, so the user device 111 should have some communication permission with the vehicle 101, which can be direct (e.g., BLUETOOTH) or indirect (e.g., through the vehicle 101 communicating to a ridesharing server, which communicates back to the device 111 and a ridesharing application including the alert process 119).

There are also other secondary vehicles 121 in this system, provided as examples of vehicles 121 that may benefit from V2V reporting on planned exits from a vehicle 101, as well as examples of possible impediments to exiting a vehicle 101 using a particular exit. While these vehicles 121 may also include complex computing systems, they are shown with a simple representation of V2V communication, as their role in the examples is described without significant reference to their internal workings. Infrastructure transceivers 125, capable of vehicle to infrastructure (V2I) communication and providing relays between vehicles and other infrastructure elements, may also be a part of the system and can help relay vehicle 101, 121 information longer distances than a given vehicle 101, 121 may be able to transmit. This can allow for planning to accommodate approaching vehicles 121 before those vehicles 121 can communicate directly with a parked vehicle 101.

Finally, in this example, several cloud 131 based systems provide support and communication. This can include, for example, a traffic control system 133, which is responsible to share traffic information between a plurality of vehicles 101, 121 and can help mass coordinate strategy, as well as convey vehicle information from vehicle 101 to vehicle 121 and vice versa. The cloud can also include an alert system 135, which can relay alerts from a vehicle 101 to a device 111, and/or otherwise assist in keeping passengers apprised of advisable exit strategies.

Figure 2:
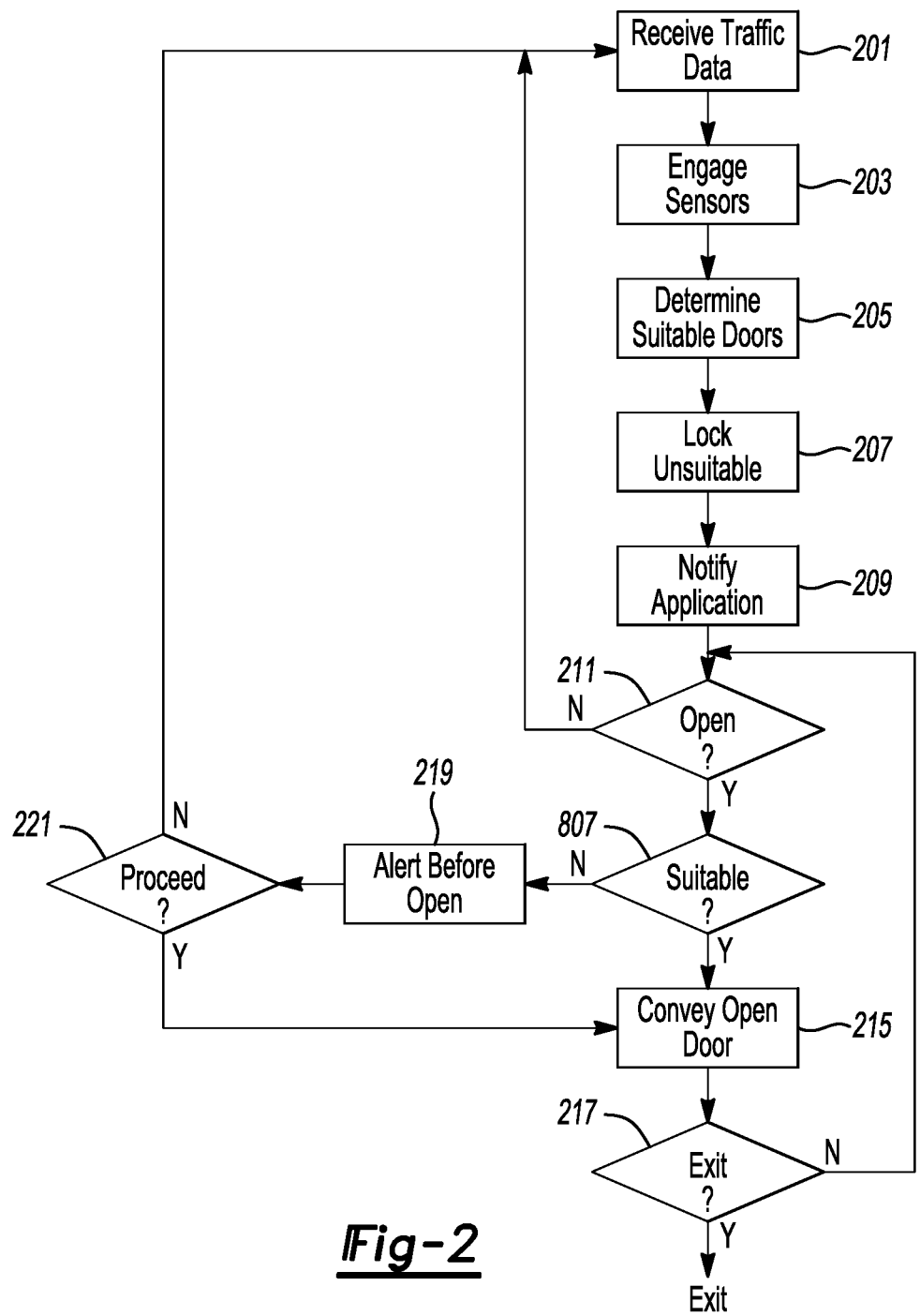
FIG. 2 shows an illustrative adaptive vehicle exit engagement process.

FIG. 2 shows an illustrative adaptive vehicle exit engagement process, executable by, for example, a vehicle 101 processor 103. In this illustrative example, a vehicle 101 is a parked or parking ridesharing vehicle 101, that is about to disembark passengers. The vehicle 101 may predict intended exit door usage based on passenger location, but since passengers are not constrained in door-usage, the vehicle 101 may determine advisability for any possible exit door of the vehicle 101.

The vehicle 101 receives traffic data at 201, which can include, for example, immediately present traffic capable of V2V communication, upcoming traffic communication with the infrastructure and which will arrive at a vehicle 101 location within a predefined time (e.g., within 1 minute of parking) via V2I communication, other planned arriving traffic in communication with a traffic control server 133 via cellular communication, etc. This information can be used by the vehicle 101 to determine any exits which may be inadvisable based on the presence or predicted presence of cross traffic or upcoming traffic.

In addition, a vehicle 101 may include a plurality of sensors capable of detecting approaching objects (vehicles, bicycles, etc) that are engaged at 203. This can be especially useful when not all vehicles 121 are connected vehicles, and therefore may lack the capability to notify vehicle 101 in advance of approach.

Based on received information and detected information, the vehicle 101 may determine which exits are advisable at 205. This can include a binary decision (suitable/unsuitable) or a gradient (suitable/proceed with caution/unsuitable) based on levels of traffic, or other conditions such as ambient light, street lighting, size of adjacent road, time of day, speed limit of adjacent road, etc.

For example, a vehicle 101 adjacent to a side street with a 20 mile per hour limit could mark all doors as suitable if it did not detect any traffic and/or was not advised of any approaching traffic. This could be because, even if a vehicle

121 suddenly arrived on the road (e.g., from a home driveway or left a parked state), the traffic would be limited and the vehicle 121 would likely be traveling slowly. On the other hand, the vehicle 101 may label doors adjacent to a high speed street, even one with limited or no traffic, as "proceed with caution" during the daylight hours, and "inadvisable" during nighttime hours, because of the possibility that an undetected or unreporting vehicle 121 may quickly arrive in a compromising location. Similar processes could be undertaken to advise passengers about which doors to use when entering a vehicle 101.

The vehicle 101 (or a process acting in the cloud on behalf of the vehicle 101) can also have access to accident information for a road, indicating a general road profile. In a similar manner, these processes can be used to advise a driver of a suitable parking location, such as advising a new location if fewer than a threshold number of doors are deemed suitable, where the threshold could be a minimum or could be determined based on how many passengers were present. Passengers may also be provided with a selectable option to request a new parking space, or select a recommended parking space which the application may identify as having improved exit advisability, presented responsive to receiving the advisability data for the vehicle. In addition to alert processes, vehicles can dynamically recommend new parking spaces as well, if a selected space is deemed or sensed to be unsuitable following arrival.

In this example, as an added measure, the vehicle 101 locks any door deemed unsuitable at 207. While this lock may be overridden, the lock (and any accompanying alert) may serve to deter use of that particular door under the presently detected and reported conditions. The vehicle 101 further notifies one or more user applications at 209, which can include the application 119 displaying an alert to a user. The alert can be in a language, or it can be a visual image of a vehicle 101 indicating suitability of various exits. Until a door is opened, the vehicle 101 can continue to address a changing traffic situation and make changes to doors and alerts as is warranted by any changes to the situation.

Once a door is open at 211, the vehicle 101 determines if the door was previously deemed, or is presently deemed, suitable at 213. If the door is a suitable door at 213, the vehicle 101 may convey an open door state to other vehicles via V2V, V2I or V2C communication. If other vehicles 121 are aware of the state, they may be provided with slow down or lane change instructions, or may even be automatically slowed when approaching within an proximity of a conveyed open door.

If the door is unsuitable, the vehicle 101 may slow opening of the door or otherwise present an alert, again on a mobile device 111 or directly to a vehicle system (e.g., a display near the door, a light near the door, and audible alert, etc) that informs the passenger that they are opening an unsuitable or at least questionable door. If the passenger still proceeds, the vehicle 101 conveys the open door status at 215. If the passenger elects not to proceed, the vehicle 101 reconsiders the suitability of doors while the passenger elects a different door or elects to wait.

Additionally, a vehicle 101 may determine the suitability-for-use of a subset of doors, based on occupancy, occupancy of defined interior spaces (rear vs forward seating), etc. For example, if a passenger (e.g., a non-driver occupant) is in the front seat, it is unlikely that the passenger would elect to use a vehicle 101 rear door, and so the suitability determination may be made with respect to the passenger door only. In such a case, the driver may continue to move the vehicle 101 until such time as the passenger door is deemed suitable above a threshold of suitability. In other instances (rear seating), two or more doors may be intended to service the interior. If only one passenger is present and proximate to one door (or, for example, if there is a curbside door and a streetside door), the determination may be made for the single door. If that door is unsuitable, the determination may be made for another door servicing the rear interior, and so on, until a suitable door is found or no suitable doors remain (again, at which point the driver may elect to move or a vehicle may recommend via driver communication that the driver move or park elsewhere).

In still a further embodiment, vehicles (the object vehicle including the passenger and other nearby vehicles observing the object vehicle and surroundings) can use sensing technology and camera technology to determine the advisability of an exit or terrain proximate to an exit. Sensors on the vehicle can detect, for example, snow, ice, mud, water, etc. immediately outside the door, as well as high curbs and other impediments.

If certain passengers have limited capability, the processes can accommodate those capabilities within an evaluation (e.g., no impediments to a wheel-chair, or even conditions that might be dangerous for a passenger who has been drinking). Users may specify preferences for distances from and step heights down to the curb, and vehicles can accommodate their own relative heights off the ground in such calculations. Age, weight and even time of day or ambient light can be used to tailor these considerations in order to ensure an exit condition within suitable parameters.

Alerts can also be tailored to a detected situation, instead of simply prohibiting an exit from a door. Colored lighting (e.g., blue for slippery, red for a long step, etc.) could be used, and actual text about the detected condition could be displayed in-vehicle or pushed to an occupant's phone. Areas around the vehicle may be shown on a display as well, and color or text-coded in accordance with detected conditions. This may also assist a parent, for example, in cautioning a child exiting a rear seat, or in aiding the parent in a determination about whether the child should be allowed to exit at all without assistance. Child-locking type doors could be configured to engage under a variety of conditions—e.g., while the door may normally not be child-locked, if a slippery, or wet, or other alert condition existed, such child locks could be automatically engaged, depending on user preferences, for example.

While much of this information will likely come from the object vehicle, it is possible to use other proximate vehicles to gather this information, whether those vehicles are immediately observing the scene or whether those vehicles observed the specific location previously (within a time limit) and observed an alert condition (e.g., the object vehicle parks over a location where another vehicle noticed ice, the object vehicle sensors may not be aimed to see the ice under the vehicle, but it may be worth an alert in case someone's foot were to contact a portion of ice sticking out from under the vehicle).

Figure 3:
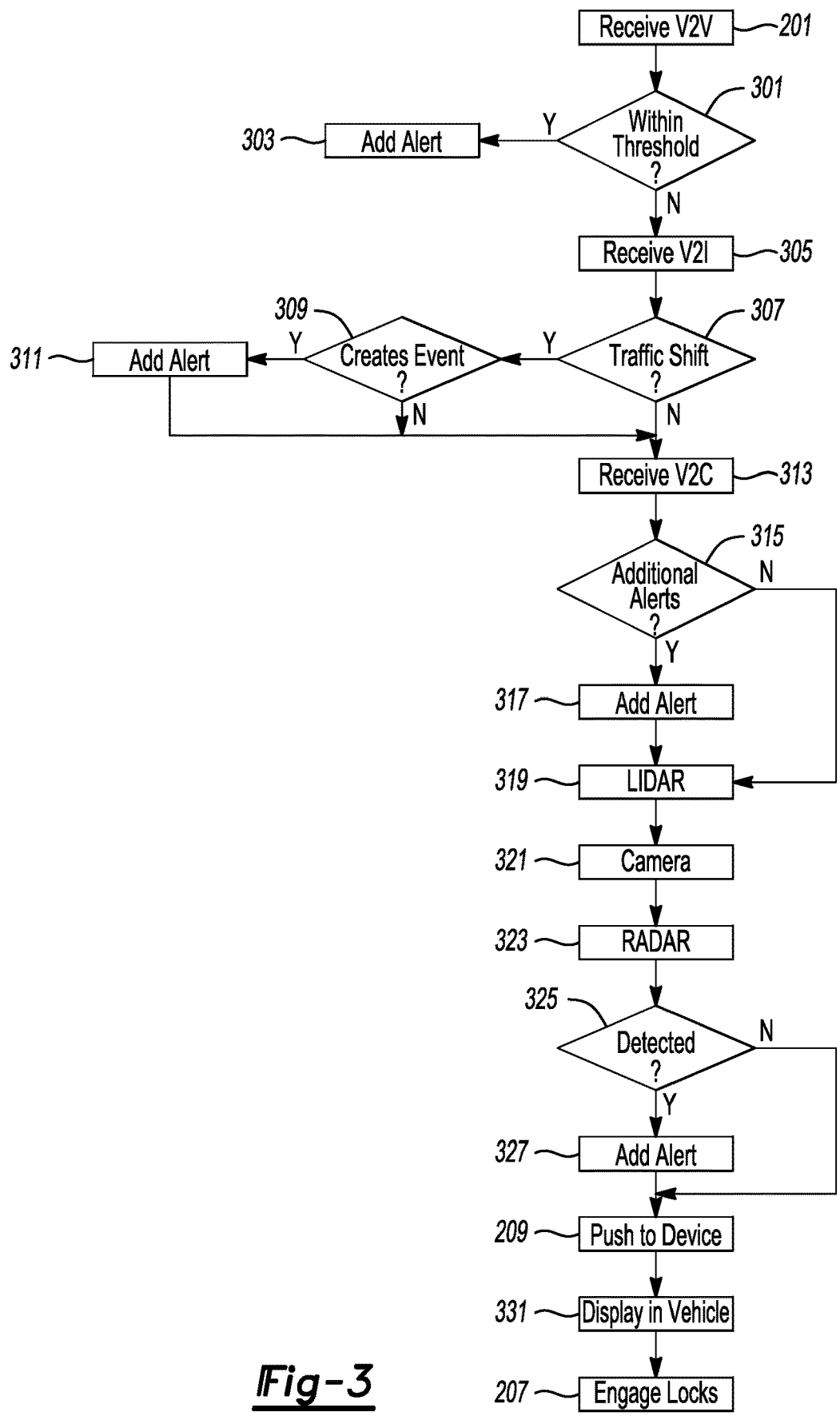
FIG. 3 shows an illustrative alert detection and presentation process.

FIG. 3 shows an illustrative alert detection and presentation process. This is another process executable by, for example, vehicle 101 processor 103. In this example, various types of illustrative inputs for a suitability consideration are discussed, and the vehicle 101 may receive V2V communication from approaching vehicles at 301. There may be predefined thresholds dictating how an approaching vehicle 121 impacts a suitability determination, such as the vehicle 121 being at X distance at Y speed, and at a shorter distance M at a lower speed N. The max distance will be impacted by the range of the V2V communication, and so in instances where all V2V communication is very short range, any vehicle 121 indicating approach to vehicle 101 may have the same impact on suitability, which is to render a door that could be adjacent to the vehicle 121 unsuitable.

If the approaching vehicle 121 is within a distance so as to render an effect on suitability at 303, as defined by suitability parameters, for example, the vehicle 101 may add an alert at 303. In this example, the vehicle 101 compiles all alerts from various sources and then delivers the alerts or delivers a report indicative of the alerts, but in other instances the alerts could be delivered as they are determined.

The vehicle 101 also receives V2I information, which can include, for example, upcoming light state changes (that could produce or reduce traffic), planned vehicle 121 approaches that are out of range of V2V communication, and any other information usable to make the suitability determination. For example, as a vehicle 101 parks, a light may be red, holding up all approaching traffic. At some point, the state may change creating a traffic shift at 307, by releasing approaching traffic. If the light state change creates a suitability-impacting event at 309, the vehicle 101 may add this to the alert consideration at 311.

The vehicle 101 may further receive V2C communication at 313, which can indicate broader intents of approaching traffic. This may be especially useful if a vehicle 101 has not yet parked, and is attempting to gauge the usefulness of various available parking options. A user may arrive at a location ahead of a crowd of others, but this V2C information may indicate a high volume of planned incoming traffic in the next few minutes, and since that traffic may or may not be connected to V2I communication, V2C may be a good way to be aware of an impending uptick in approaching traffic. If the V2C information indicates any approaching traffic not identified by V2V or V2I communication at 315, the vehicle 101 can add yet another alert factor to consider at 317.

Once all data has been gathered from communication, the vehicle 101 can also gather proximity data via a set of sensors. This can include activating, for example, without limitation, LIDAR sensors 319, cameras 321, radar 323, and any other vehicle 101 sensor capable of detecting oncoming or present traffic. If any movement or objects indicative of a problem or defined as impacting a suitability determination are detected at 325, the vehicle 101 can also add those objects to an alert profile and consider them for a suitability determination.

Once all relevant data has been received and sensed, the vehicle 101 can send any relevant alerts to a device 111, which can then inform the passengers as to the suitability (or projected suitability of doors for a given parking location). In some examples, the vehicle 101 could calculate suitability in advance of arrival for a plurality of parking locations, and the passengers could select different locations to see different suitability determinations. In other examples, the vehicle 101 could use this information to recommend parking spaces to a driver, and certain ridesharing applications may instruct drivers to use certain parking based on such determinations and based on a number of passengers or other characteristics. Such suitability determinations can be made based on projected traffic and conditions at a projected parking location at a time when the vehicle 101 is projected to arrive at the parking location.

The vehicle 101 may also display the alerts at 331, which can include using specialized alerts (lights, screens, etc) proximate to doors, or in-vehicle displays or audio systems. The presentation of alerts can extend to engaging locks on certain doors 207, which may be overridden, but the presence of which may deter exiting through a door or may at least cause a user to exit carefully after overriding the locked door.

Figure 4:
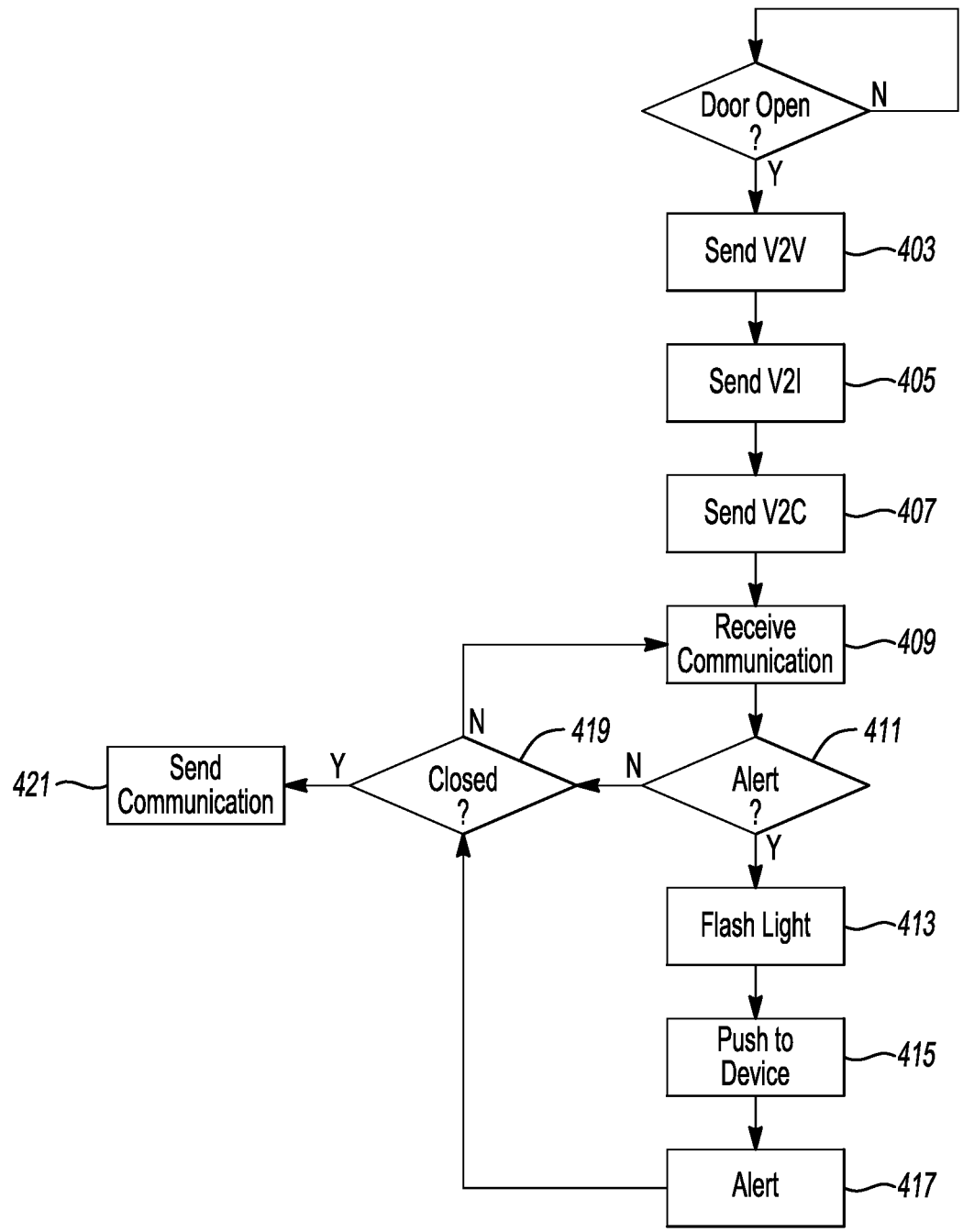
FIG. 4 shows an illustrative vehicle state alert process.

FIG. 4 shows an illustrative vehicle state alert process executable by, for example, a vehicle 101. This process allows the vehicle 101 to inform other vehicles 121 about a door state and or planned exits, and can assist in mitigating an effect that other vehicles 121 may have on exiting (or entering) passengers. It may even be possible to signal intent to open a door through an application or an in-vehicle control, for example, and thus to report a door as open or in-use even prior to the door actually being opened.

In this example, the vehicle 101 determines that a door has been opened at 401. Again, this could also include detection of a passenger intent to open a door, which could be signaled by, for example, selection of a door on an application, engagement of a button indicative of intent, specifically unlocking a single locked door, unlocking all doors (could report all doors as active), or engagement of a door handle inside or outside the door. Certain aspects will provide more advance notice than others, while certain aspects will provide more certainty than others, as will be appreciated.

When the door is opened (or any other vehicle 101 state change occurs that may be relevant to the traffic, such as a hatch opening), the vehicle 101 reports the state change or indication of state change intent to other vehicles 121 via V2V at 403, to the infrastructure via V2I at 405, and to the cloud via V2C at 407.

In addition to alerting other vehicles 121 of the door states, this allows other vehicles 121, the infrastructure 125 and the cloud traffic control 133 the chance to determine that an event may be possible, and to notify the object vehicle 101 of the possibility of event. For example, the door may be opened when there is not traffic, but then a vehicle 121 may pull out from a parking lot down the street and achieve a speed of 50 mph, heading for the vehicle 101. This can create a possible event, to which several illustrative responses can occur, such as slowing the vehicle 121, alerting the occupants of the vehicle 101, and instructing the vehicle 121 to move to lanes far from the vehicle 101, if such movement is possible.

As each other vehicle 121 may be capable of reacting to the door-state detected at 401 and transmitted at 403, 405, 407, the object vehicle 101 may also receive any alerts from the cloud, infrastructure or vehicle 121 resulting from the broadcast at 409. This can be an immediate alert, or status information that a given vehicle 121 may be approaching in the near future. If the alert is immediate at 411, which can, for example, indicate the presence of a vehicle 121 that vehicle 101 did not account for, the vehicle 101 can immediately flash a warning light at 413 or issue another immediate alert via an in-vehicle system. The vehicle (or the cloud) can also send this alert to a user device at 415, which could be useful if the vehicle 101 was not provided with an interior alert system, or as an additional alert to help ensure that the exiting or entering passenger is aware of the change.

The device 111 may then present the alert as well, at 417. Until the door is closed at 419, this alert-updating can persist, since the state of traffic may be constantly changing as passengers are loading or unloading. Once the door has been closed at 419, the vehicle 101 can send a notification to all relevant entities (e.g., cloud 131, infrastructure 125, vehicles 121) that the door is now in a closed state. This can allow traffic to react accordingly, and if the door state again changed, the reporting and alert process could begin anew.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine an upcoming vehicle occupancy change event for an object vehicle;
responsive to determining the occupancy change event, determine a suitability-for-use of one or more vehicle doors based on a traffic prediction; and
alert at least one vehicle occupant as to the suitability-for-use of each door for which the suitability determination was made.

2. The system of claim 1, wherein the occupancy change event includes a vehicle entry event and the processor is configured to determine the event based on an indication that a vehicle has arrived at a pickup location.

3. The system of claim 1, wherein the occupancy change event includes a vehicle exit event and the processor is configured to determine the event based on an indication that a vehicle has arrived at a dropoff location.

4. The system of claim 1, wherein the traffic prediction is based on information wirelessly received from at least one other vehicle within a direct communication range of the object vehicle communicating information to convey a projected path of the at least one other vehicle.

5. The system of claim 1, wherein the traffic prediction is based on information wirelessly received from at least one infrastructure element communicating with the object vehicle to convey traffic state information.

6. The system of claim 1, wherein the traffic prediction is based on information wirelessly received from at least one server remote from the object vehicle communicating with the object vehicle to convey traffic state information.

7. The system of claim 1, wherein the alert includes locking at least one door for which a suitability-for-use determination resulted in an outcome predefined as correlated to locking the door.

8. The system of claim 1, wherein the alert includes issuing an alert via an in-vehicle system.

9. The system of claim 8, wherein the in-vehicle system includes a display or a vehicle audio system.

10. The system of claim 8, wherein the in-vehicle system includes a vehicle interior light.

11. The system of claim 1, wherein the alert includes sending an alert from the object vehicle to a user mobile device in communication with the object vehicle.

12. The system of claim 1, wherein the alert includes sending an alert from the object vehicle to a user mobile device application used to hail the object vehicle.

13. The system of claim 1, wherein the upcoming occupancy change event includes an event projected to occur more than a predetermined threshold of time away, and wherein the processor is further configured to:
identify at least one parking location;
determine the suitability-for-use based on the traffic prediction as though the object vehicle were parked in the parking location at a time when the object vehicle is projected to be parked in the parking location; and
responsive to determining more than a threshold number of doors are unsuitable for use, recommend, via communication with a vehicle driver, that the vehicle driver not park in the parking location.

14. The system of claim 13, wherein the processor is configured to identify the at least one parking location based on input from a vehicle passenger mobile device identifying the parking location on a map.

15. The system of claim 1, wherein the upcoming occupancy change event includes an event projected to occur more than a predetermined threshold of time away, and wherein the processor is further configured to:
identify at least two parking locations;
determine the suitability-for-use based on the traffic prediction as though the object vehicle were parked in each of the parking locations at a time when the object vehicle is projected to be parked in a respective each of the parking locations; and
responsive to more doors determined as being suitable for use in a first of the at least two parking locations than in a second, recommend, via communication with a vehicle driver, that the vehicle driver park in the first parking locations.

16. The system of claim 1, wherein the processor is further configured to:
detect that a vehicle door has been opened;
wirelessly transmit data indicating that the door has been opened, to at least one entity remote from the object vehicle;
responsive to wirelessly transmitting the data, receive an indication that another vehicle is approaching;
determine that the another vehicle approaching will modify the suitability-for-use of the open door; and
responsive to determine that the another vehicle approaching will modify the suitability-for-use of the open door, issue an alert detectable by a vehicle passenger indicating that the suitability-for-use of the open door has changed.

17. The system of claim 1, wherein the processor is configured to determine a suitability-for-use of at least each door proximate to an in-vehicle location where a non-driver occupant is detected as being located.

18. The system of claim 1, wherein when the processor determines suitability-for-use of a first set of doors fewer than all vehicle doors intended to be used for access to a given vehicle interior space, and when the processor determines that none of the first set of doors meet a predefined suitability threshold, the processor is configured to continue determining suitability-of-use for remaining doors other than the first set of doors, the remaining doors also intended to service the given vehicle interior space, and the determining continuing until at least one of the suitability determination being above the threshold for at least one of the remaining doors or no remaining doors exist for determination of the suitability-for-use.

19. A system comprising:
a processor configured to:
determine an upcoming vehicle occupancy change event for an object vehicle based on the object vehicle being parked;
responsive to determining the occupancy change event, determine a suitability-for-use of one or more vehicle doors based on a traffic prediction and based on sensed data,
wherein the traffic prediction is based on at least data wirelessly received from at least one entity remote from the object vehicle and wherein the data is indicative of projected traffic in a predefined proximity to the one or more vehicle doors, and wherein the sensed data includes data about an environment exterior to the object vehicle, sensed by at least one sensor of the object vehicle and indicative of at least one entity presence predefined as affecting a suitability-for-use determination; and alert at least one vehicle occupant as to the suitability-for-use of each door for which the suitability determination was made.

20. A system comprising:

a processor configured to:

determine a plurality of possible parking locations for an occupancy change event planned for an object vehicle at an object vehicle destination;

determine a suitability-for-use of one or more vehicle doors for each of the plurality of possible parking locations, the suitability determined based on projected traffic patterns for traffic projected to be within a predefined proximity to the one or more vehicle doors, as indicated by data received from at least one entity remote from the object vehicle; and notify a vehicle driver of one or more of the plurality of parking locations for which a suitability-for-use of at least one door is above a predefined suitability threshold.

* * * * *